Oct. 16, 1962  H. A. ROBINSON  3,058,372
GAS POWERED TRANSMISSION
Filed June 7, 1961  2 Sheets-Sheet 1
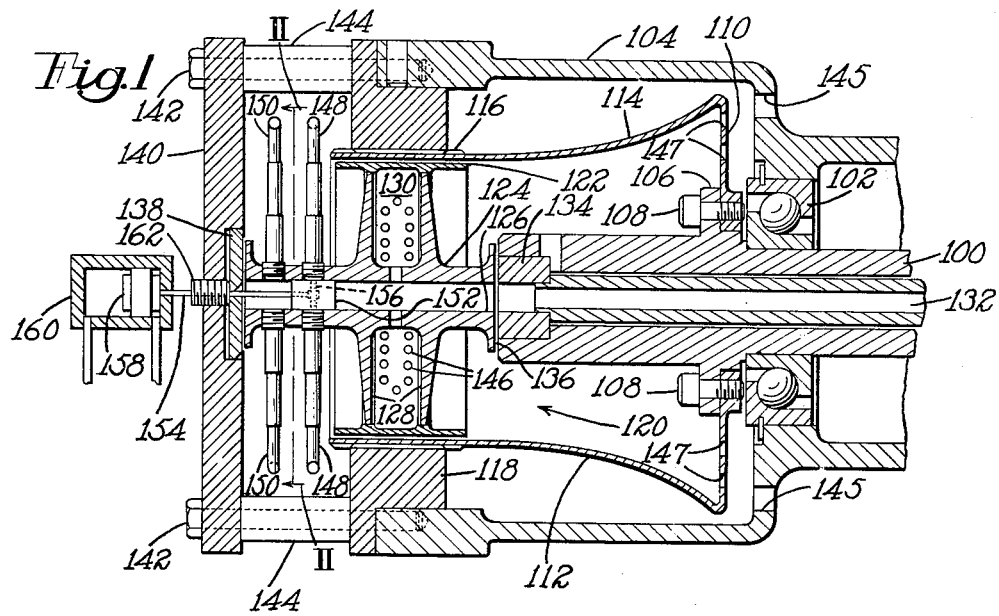
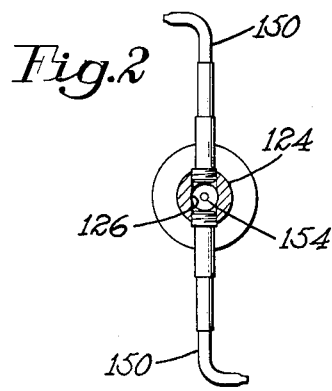
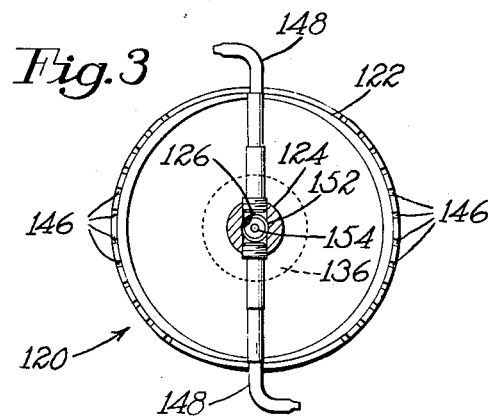
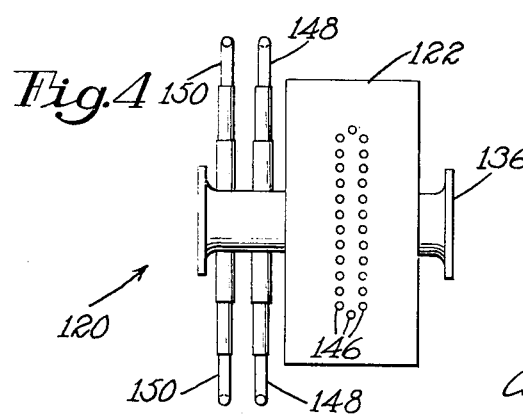
*Inventor*
Hugh A. Robinson
By his Attorney
Carl E. Johnson

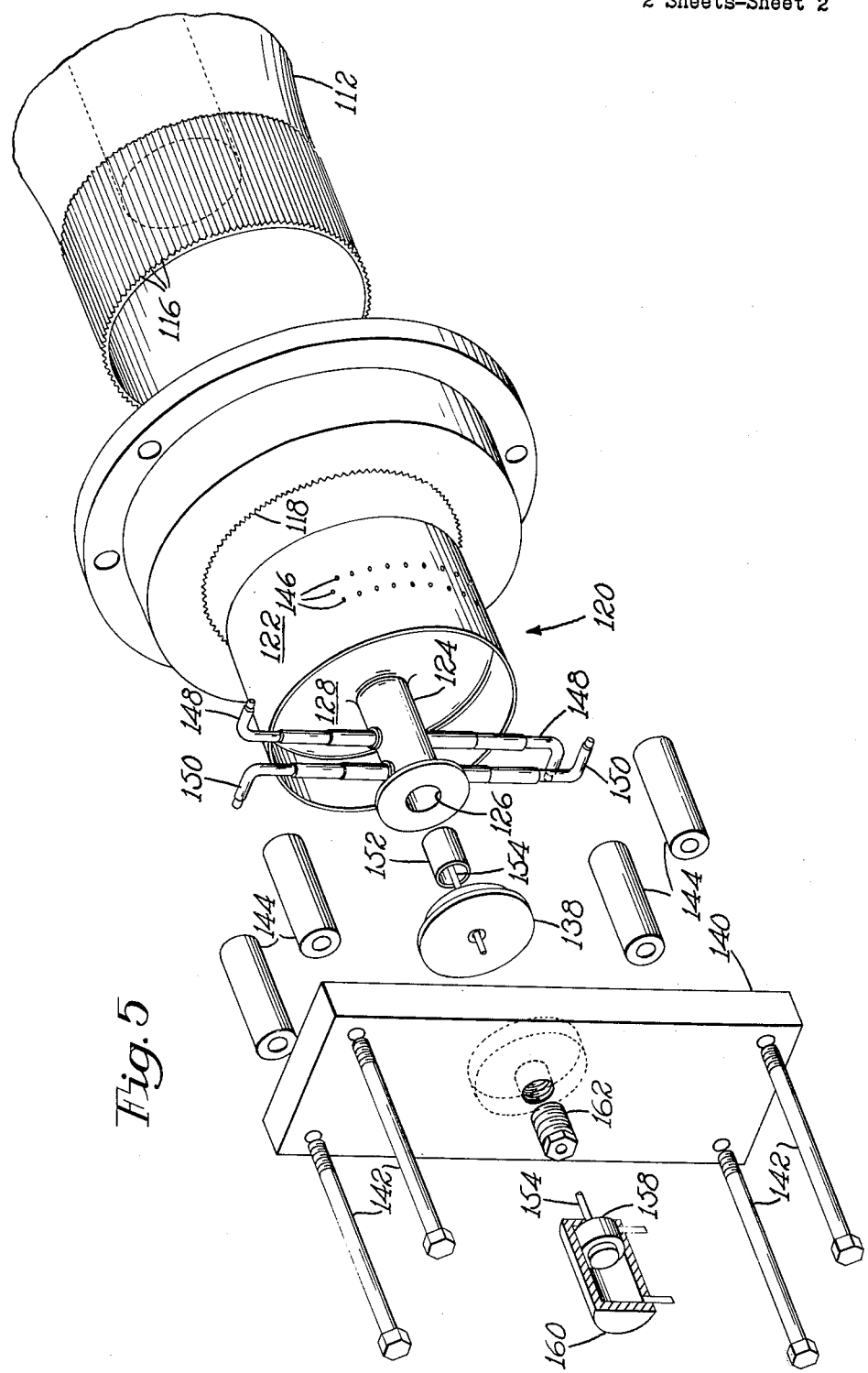

United States Patent Office 3,058,372
Patented Oct. 16, 1962

3,058,372
GAS POWERED TRANSMISSION
Hugh A. Robinson, Wenham, Mass., assignor to United Shoe Machinery Corporation, Flemington, N.J., a corporation of New Jersey
Filed June 7, 1961, Ser. No. 115,418
10 Claims. (Cl. 74—640)

This invention relates to improvements in power transmission. More particularly the invention is concerned with providing a transmission of the harmonic drive type wherein fluid under pressure advantageously serves to couple two of the operating elements and also serves as a source of power. By way of illustration and not of limitation the invention is herein shown and described with reference to gas driven reduction mechanism.

In a harmonic drive type transmission, as more fully disclosed for instance in United States Letters Patent No. 2,906,143, issued on an application filed in the name of C. W. Musser, a wave generator is commonly used mechanically to effect progressive deformation and engagement of a radially deflectable toothed member with a cooperating gear at circumferentially spaced lobes. Any one of the members may usually serve as an input and another functions as an output. Thus, in the course of its operation in various machine applications, an input wave generator has commonly performed three functions:

(1) Propagated the shape needed for effecting tooth engagement,
(2) Opposed tooth separating force, and
(3) Transmitted the driving torque. The present invention, in one aspect, accordingly has as its main purpose to facilitate accomplishment of these functions by providing, in effect, a frictionless coupling between the wave generator and the flexible gear. It is also an object of this invention to provide an improved fluid pressure-operated harmonic drive operable over wide ranges of speed and temperature and especially useful under extreme environmental conditions, for instance as encountered in outer space.

In accordance with these objects, a feature of the invention resides in the combination with a harmonic drive transmission comprising a pair of coaxial gears the inner one of which is radially deflectable to cooperate with the other, of a wave generator within the inner gear having a plurality of peripherally spaced lobes, the latter having an operating clearance with the internal diameter of the inner gear when radially deflected, and means for introducing a pressurized fluid medium into the lobar clearances during roation of the wave generator to provide for its frictionless coupling to the flexible gear while aiding in effecting tooth engagements of the gears.

Another and more specific feature of the invention consists in the provision of a gas-driven motor-reducer unit comprising a fixed gear, a rotatable flexible tubular gear having external teeth engageable with internal teeth of the fixed gear, an output member coupled to the flexible gear, a wave generator coaxial with the gears and having circumferentially spaced pneumatic film bearing surfaces for exerting teeth deflecting pressure radially outward on closely adjacent portions of the inner wall of the flexible gear, reaction jet means for driving the wave generator on its axis, and means for supplying air under pressure to the jet means and to said pneumatic bearing surfaces whereby spaced localities of teeth in engagement and non-engagement are peripherally advanced to operate the driven member.

As illustrated herein a pressurized fluid film is relied upon to aid the generator in radially deflecting the flexible gear and to prevent any contact between the wave generator and the flexible gear, and of course the pressure in the gap between them (which should be of reasonably constant clearance of the order of not substantially more than .001") must be adequate to withstand the separating forces which occur at the points of teeth contact. It will be apparent that other means than jet propulsion may be used to drive the pneumatic wave generator if desired. In missile applications, for example, high temperature gas is abundantly available at least during controlled flight to provide a transmission constructed in accordance with this invention with both driving energy and bearing fluid. In the novel construction herein shown a combination wave generator and jet operating means is rotatable with a very low order of friction at very high speeds on gas lubricated and self-centering thrust as well as radial bearings.

Although the invention is illustrated as applied to a two-lobe type of pneumatic wave generator, this being preferred for high speed units where their diameter may be in the range of 3–10", it will be appreciated that wave generators may be provided to afford three or more fluid pressure bearing lobes as may be desired. Various peripheral surface bearing pressure configurations or patterns on a wave generator lobe may be employed for different operating temperatures and pressures of the fluid, and while bearing feed orifices are herein shown arranged symmetrically with regards to the major axis of the elliptoidal flexible gear (for purposes of reversibility) trials indicate that, for a given fluid pressure, a non-symmetric orifice or hole configuration, with holes trailing the major axis eliminated, produces better moment-carrying capacity of the fluid film coupling.

The above and other features of the invention together with various novel details of construction and combinations of parts will now be more particularly described in connection with an illustrative transmission in which they are embodied, and with reference to the accompanying drawings thereof, in which:

FIG. 1 is a longitudinal section of a gas driven motor-reducer unit;

FIG. 2 is a section taken on line II—II of a pneumatic wave generator in FIG. 1 and looking in the direction of the arrows to indicate one pair of driving jets;

FIG. 3 is a view of the wave generator of FIG. 1 as seen when looking in a direction opposite to that of the arrows in FIG. 1;

FIG. 4 is a detail view of the wave generator unit; and

FIG. 5 is an exploded perspective view of much of the drive mechanism of FIG. 1.

In the motor-reducer unit of FIG. 1 which may, for instance, be incorporated in a high temperature, pneumatic servo system, a tubular output shaft 100 is rotatably journaled in a bearing 102 in a relatively stationary casing 104. For driving the shaft 100 it is provided with a collar 106 secured by screws 108 to a radial end flange 110 of a flexible gear 112 (FIGS. 1 and 5). In this instance the gear 112 preferably has an intermediate flared portion 114 and a radially deflectable cylindrical end portion formed with external teeth 116. This type of shaped flexible gear, by reason of its load-carrying capacity resulting from uniform radial tooth deflection, and other favorable characteristics, is of considerable merit in a harmonic drive type transmission as more fully set forth in a copending application Serial No. 108,600, filed May 8, 1961, in the names of H. F. Schaefer, Jr., and F. B. Jennings. Fixedly secured within the casing 104 for cooperation with the teeth 116 is an internally toothed ring gear 118 (having more teeth than the teeth 116), and completing the harmonic drive speed reducer is a fluid pressure, elliptoidal wave generator generally designated 120 (FIGS. 1, 4 and 5) disposed coaxially within the gears 112, 118. The teeth 116 of the flexible gear, under the circumferential wave propagating effect of the rotating generator 120 as will be described, are deflected outwardly progressively to mesh with the teeth of the gear 118 at (in this case two) equally spaced lobes interspaced by non-engaging teeth thus transmitting torque to the output shaft 100. Unlike the usual mechanical harmonic drive transmission, however, the wave generator 120 does not come into contact with either the flexible gear 112 or the ring gear 118, but is adapted to direct a portion of its driving energy in the form of a fluid medium, such as hot gas, against the inner wall of the toothed portion of the gear 112. Advantageously, in addition to providing some tooth deflecting force, the fluid medium simultaneously serves, as will be explained, to rotate the wave generator and to provide for its almost frictionless operation. To these ends the wave generator is formed with a smooth elliptoidal peripheral 122 having an operating clearance with the internal diameter of the deflected cylindrical portion carrying the teeth 116. The hub 124 of the generator is formed with an axial bore 126 and provided with axially spaced radial webs 128, 128 for supporting the elliptoidal periphery 122. A chamber 130 (FIG. 1) between these webs is in communication with the bore 126 which, in turn, is axially alined with a conduit 132 leading from a suitable source of fluid under pressure. An inner end of the conduit is journaled in a bearing 134 in an end of the shaft 100. A flat flanged end face 136 formed on one end of the hub 124 is spaced by a narrow gap from coplanar inner end faces of the shaft 100 and of the bearing 134 to provide a fluid film thrust bearing in the gap during operation. Similarly, the opposite end of the hub 124 is spaced to provide a fluid film thrust bearing with a tilting-shoe-type bearing disk 138 (FIGS. 1 and 5) recessed in an end plate 140. The latter is adjustably secured to the casing by means of cap screws 142 and spacers 144.

In order to direct driving energy radially to deflect the gear 112 and at the same time provide peripheral bearing fluid from the wave generator under suitable pressure, the periphery 122 is formed with diametrically disposed bearing surface configurations comprised of bearing feed orifices 146 (FIGS. 1, 3 and 4) communicating with the chamber 130. The configurations are herein illustrated as symmetrical for purposes of affording reversibility in drive, the orifices or holes being shown as spaced equiangularly from the major axis of the elliptoidal shape to which the flexible gear is to be mechanically and pneumatically deformed during operation. Trials have indicated that a somewhat higher efficiency can be expected from a non-reversible arrangement wherein the orifices are non-symmetrically arranged; moreover, experiment indicates such an organization normally will have an improved moment-carrying capacity. Bearing fluid may exhaust at ports 145 (FIG. 1) in the casing and apertures 147 in the flexible gear 112.

For reversibly rotating the wave generator and variable controlling output, two pairs of propulsion jet nozzles 148, 148 and 150, 150 of the converging or converging-diverging types are respectively threaded into the hub 124 for communication with the bore 126 as controlled by a sleeve valve 152 (FIGS. 1 and 5). This valve is axially shiftable in the bore 126 by means of its stem 154 which is connected at one end to a transverse web 156 (FIG. 1) of the sleeve and at the other end to a reciprocable control piston 158 in a fixed cylinder 160. The web 156 is apertured to permit axial flow of fluid therethrough. Thus, as shown in FIG. 1, pressure fluid being admitted to the left-hand end of the piston 158, the sleeve valve 152 is maintained in position to render the jets 148 inoperative and render the jets 150 operative to drive the wave generator 120 clockwise as indicated in FIG. 3. If it is desired to reverse rotation of the output shaft 100, pressure fluid will be admitted to the right-hand end of the piston 158 to shift the valve 152 to the left as viewed in FIG. 1, and now the jets 150 are rendered inoperative and the jets 148 drive the generator 120 in the direction shown in FIG. 2. The stem 154 extends axially through a rounded, non-jamming central opening in the disk 138 and through a plug 162 threaded into the plate 140.

It is of course desirable that the wave generator 120 operate with a minimum of leakage of the pressurized bearing fluid and that it be dynamically stable. Accordingly, it may be preferable that the jets 148 and 150 be 90° out of phase with the orifices 146. For a given wave generator it may be that it will be desirable to vary the orifices 146 as to size, shape or geometrical arrangement, for instance in a manner to insure that where their radial clearance from a flexible gear tends to become relatively large, they are not acting as nozzles, excessively increasing fluid consumption.

Operation of the above described embodiment will now be reviewed briefly. Input torque to the flexible gear results from a force coupling which in turn arises from a pressure distribution over the two opposed fluid bearing operating areas on the periphery of the wave generator. Fluid pressure ahead of the axis of tooth engagement provides a resultant force to the flexible gear having a moment arm offset from the center of rotation. This moment arm, the area of the pressurized region (each of which desirably covers a 90° sector of the generator perimeter 122), and the pressure determine the torque capacity of the unit. Advantageously the fluid pressure is used to locate the wave generator in the radial and axial directions by self-centering radial and thrust bearings. Thus, for instance, if the wave generator 120 shifts axially toward the bearing 134 and the shaft 100, Bernoulli forces come into play against the face 136 to enlarge the adjacent fluid bearing gap and re-center the hub 120 axially, the plate 138 suitably accommodating its adjacent fluid bearing. It will be clear that speed of the output shaft may be varied in either direction by a shifting of the control piston 158 to cause the valve 152 to move axially and partly block fluid flow to either of the jets 148 or 150.

From the foregoing it will be appreciated that the invention provides a compact transmission capable of operating at high temperatures, over a considerable range of fluid temperatures and pressures, and at a very low level of friction because of the unique mounting of the wave generator. While the flexible gear is herein illustrated as being coupled to the output member 100, it will be understood that, as above indicated, when preferred the flexible gear may be anchored to the casing 104 and thus held against rotation, in which case the ring gear 118 would be coupled to the output member.

Having thus described my invention, what I claim as new and desire to secure by Letters Patent of the United States is:

1. A harmonic drive type transmission comprising a fixed ring gear and a cooperating flexible gear mounted for rotation therein, a wave generator coaxially disposed in the flexible gear and having at least two spaced peripheral portions arranged and adapted to provide fluid bearings therebetween, means for rotating the wave generator on its axis, and means for supplying a fluid medium under pressure to said wave generator bearing portions to induce a rotary strain wave in the flexible gear whereby it is driven relatively to the ring gear.

2. A transmission as set forth in claim 1 and further characterized in that the means for supplying the fluid medium to the wave generator is also used to energize the means for rotating the wave generator.

3. A transmission as set forth in claim 1 and further characterized in that the means for supplying the fluid under pressure to induce a strain wave also serves to provide opposed, fluid film thrust bearings for axially locating the wave generator.

4. A transmission as set forth in claim 1 and further characterized in that the means for rotating the wave generator consists in a pair of jet reaction nozzles operatively coupled to said means for supplying the fluid medium.

5. A transmission as set forth in claim 1 and further characterized in that the means for rotating the wave generator consists in two pairs of jet reaction nozzles alternatively operatively coupled to said means for supplying the fluid medium one of said pairs being adapted to rotate the wave generator in one direction and the other pair being adapted to rotate the wave generator in the opposite direction.

6. A transmission as set forth in claim 5 together with means for regulating the supply of fluid medium to either of the reaction nozzles variably to control the output of the flexible gear.

7. For use in a harmonic drive type transmission having a flexible gear, a casing therefor, an output member journaled in the casing and coupled to one end of the flexible gear, a ring gear secured to the casing for cooperation with external teeth formed on the other end of the flexible gear, a wave generator coaxially mounted within the flexible gear and having a tubular hub provided with radial end faces, the wave generator having an elliptoidal periphery formed to provide an operating clearance with the flexible gear and diametrically opposed fluid bearing surfaces communicating with the tubular hub and closely adjacent to the flexible gear radially opposite to its teeth, a self-aligning bearing disk supported by the casing for providing a fluid thrust bearing with one of said faces, power means for rotating the wave generator to propagate a strain wave in the flexible gear, and means for supplying a fluid medium under pressure via the tubular hub to the thrust bearing and peripheral fluid bearing surfaces, the pressure developed at the latter in effect providing a substantially frictionless coupling of the wave generator and the flexible gear while driving the output member.

8. A transmission as set forth in claim 7 wherein the power means is a pair of reaction jet nozzles.

9. For use in a transmission having a flexible tubular gear provided with axially extending, circularly disposed teeth, a rotary wave generator in telescoping relation with said teeth, said generator having a smooth elliptoidal surface closely adjacent to a cylindrical surface of the gear opposite its teeth, and said elliptoidal surface being formed in the vicinity of its major axis with radial orifices arranged substantially symmetrically with respect thereto for supplying fluid under pressure into the space between said elliptoidal and cylindrical surfaces.

10. A harmonic drive type transmission comprising a ring gear and a flexible gear coaxially mounted for spaced tooth interengagements, and for relative rotation, an output member coupled to one of said gears, the other of said gears being restrained against rotation about their common axis, a wave generator coaxially disposed and having at least two spaced peripheral portions arranged and adapted to provide fluid bearings for the flexible gear, means for rotating the wave generator on its axis, and means for supplying fluid under pressure to the fluid bearings to induce a rotary strain wave in the flexible gear whereby the output member is driven.

References Cited in the file of this patent

UNITED STATES PATENTS

| | | |
|---|---|---|
| 753,735 | Prescott et al. | Mar. 1, 1904 |
| 999,776 | Gill | Aug. 8, 1911 |
| 1,454,286 | Johnson | May 8, 1923 |
| 2,906,143 | Musser | Sept. 29, 1959 |
| 2,932,986 | Musser | Apr. 19, 1960 |